Aug. 14, 1945.    J. G. JOACHIM    2,382,062
LATCH
Filed April 26, 1943    2 Sheets-Sheet 1

INVENTOR.
JOSEPH GEORGE JOACHIM
BY
ATTORNEYS

Aug. 14, 1945.  J. G. JOACHIM  2,382,062
LATCH
Filed April 26, 1943  2 Sheets-Sheet 2
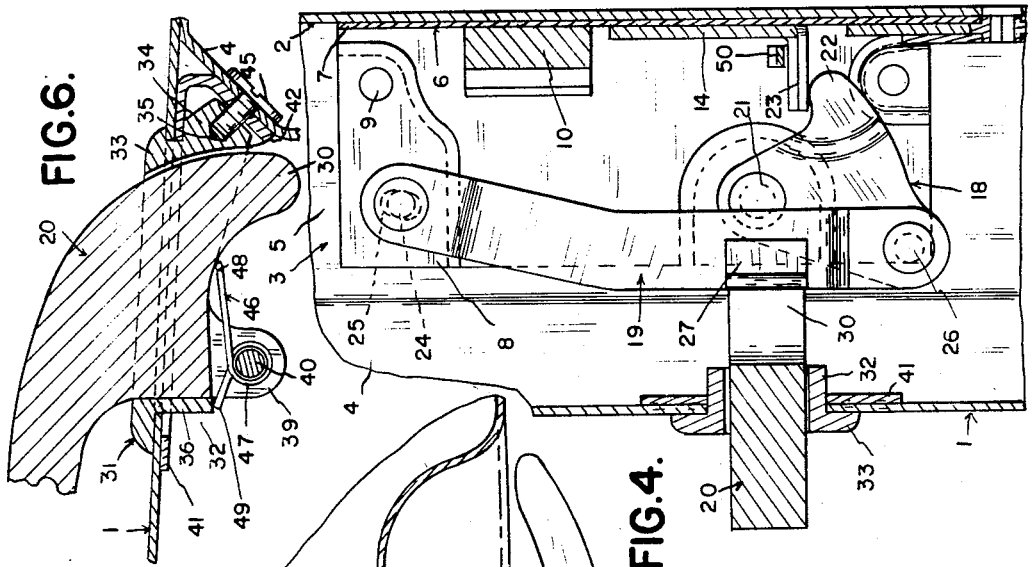
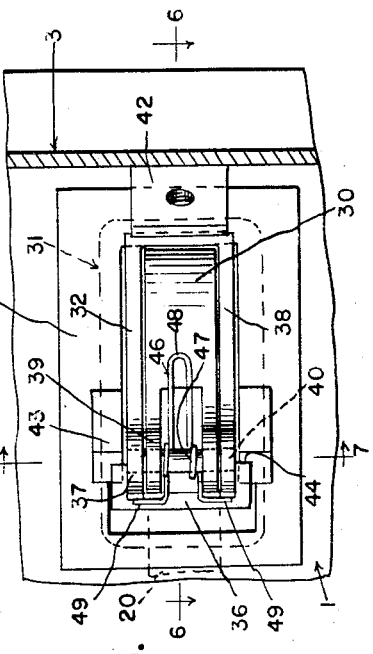
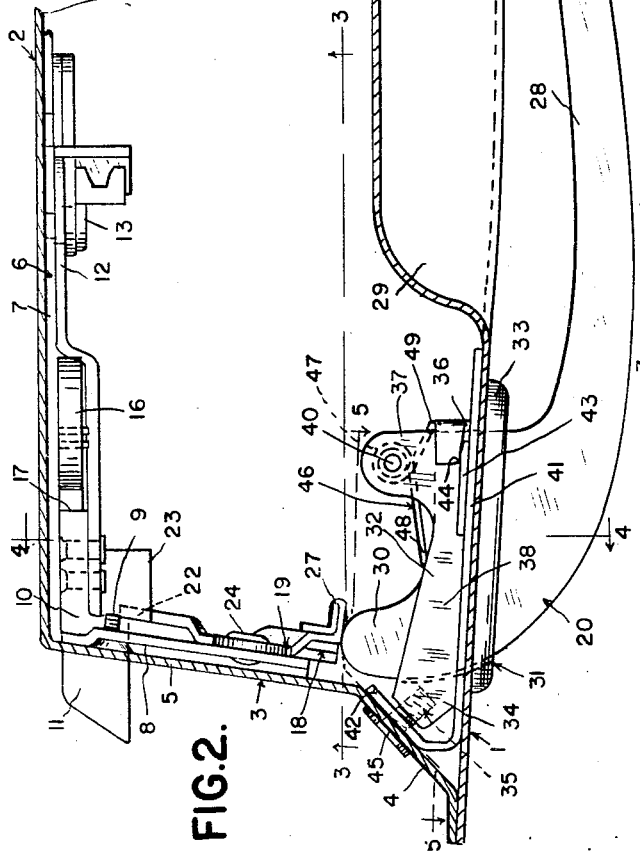
INVENTOR.
JOSEPH GEORGE JOACHIM
BY
ATTORNEYS Patented Aug. 14, 1945

2,382,062

UNITED STATES PATENT OFFICE 2,382,062

LATCH

Joseph George Joachim, Detroit, Mich., assignor to Ferro Stamping & Manufacturing Company, Detroit, Mich., a corporation of Michigan Application April 26, 1943, Serial No. 484,610

3 Claims. (Cl. 292—164)

The invention relates to latches especially for automobile doors and refers more particularly to latch actuating mechanisms.

The invention has for one of its objects to provide an improved latch actuating mechanism having a handle of the pull-out type free from positive connection with the latch so that the handle when released in an operating position may be returned to its normal position independently of the latch.

The invention has for another object to provide an improved mechanism between the handle and the latch bolt for securing the required movement of the latter with the desired leverage and also within the desired range of angular movement of the handle whereby the latch bolt may be readily and easily moved to released position.

The invention has for a further object to provide an improved mounting for the handle.

With these as well as other objects in view, the invention resides in the novel features of construction and combinations and arrangements of parts as more fully hereinafter set forth.

In the drawings:

Figure 2 is a cross section on the line 2—2 of Figure 1;

Figure 1:
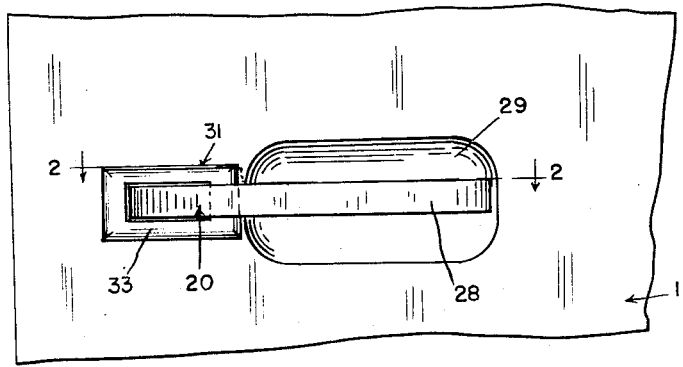
Figure 1 is an outside elevation of a portion of an automobile door having applied thereto a latch and latch actuating mechanism embodying the invention.
Figure 3:
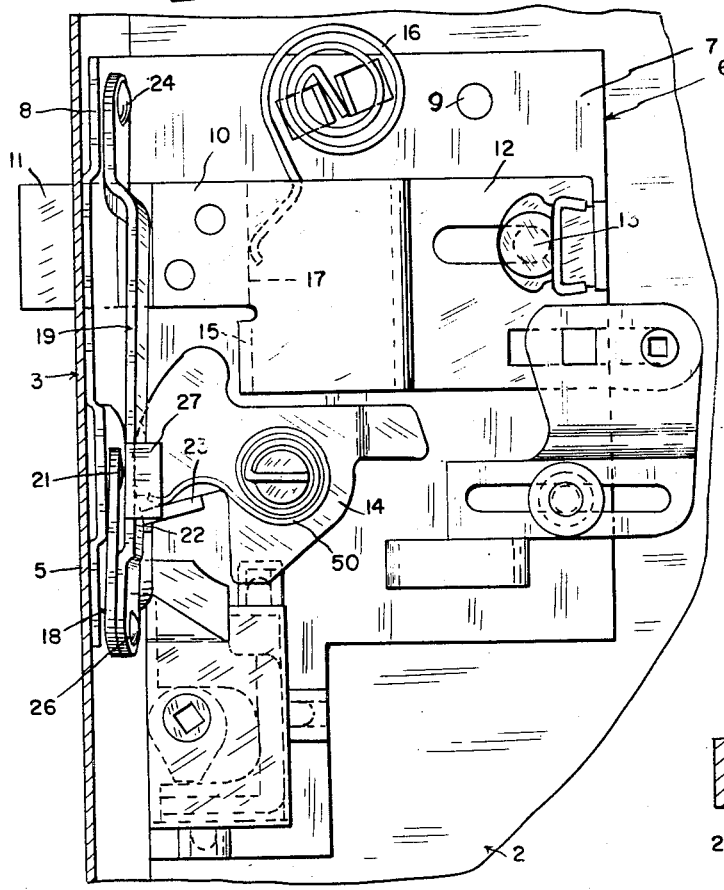
Figure 7:
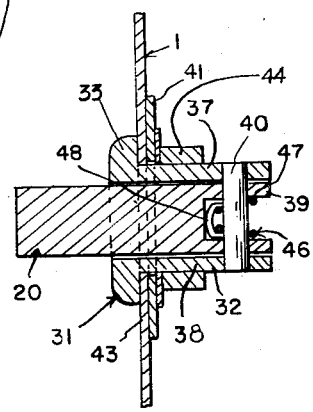

Figures 3, 4 and 5 are cross sections on the lines 3—3, 4—4 and 5—5, respectively, of Figure 2;

Figures 6 and 7 are cross sections on the lines 6—6 and 7—7, respectively, of Figure 5.

As illustrated in the drawings, the automobile door has the laterally spaced outside and inside panels 1 and 2 and the pillar 3 extending between the panels at the swinging edge of the door and having the portion 4 connecting into the outside panel at an acute angle and the portion 5 connecting into the inside panel at an obtuse angle.

The latch has the latch plate 6 which is formed with the base 7 and the transverse flange 8, the base and flange being respectively secured to the inside panel 2 and the portion 5 of the pillar 3 by suitable means, such as the screws 9. 10 is the latch bolt slidably mounted on the base, it having the nose 11 slidably extending through openings in the flange 8 and pillar portion 5 and a longitudinally extending slotted portion 12 through the slot of which extends the rivet 13. The length of the slot is such that when the bolt has been slid longitudinally to its released position the rivet will engage an end of the slot to limit any further movement of the bolt. 14 is a roll-back for moving the bolt to released position, the roll-back being pivotally mounted on the base 7 and engageable with the transverse shoulder 15 formed on the bolt. For normally holding the bolt in its extended or latching position, there is the spring 16 secured to the base 7 and engaging a second transverse shoulder 17 on the bolt.

The actuating mechanism for the latch comprises the actuating dog 18, the lever 19, and the handle 20. The dog 18 is pivotally mounted at its upper end upon the transverse flange 8 near its lower end by means of the rivet 21. The dog extends transversely of the roll-back 14 and has the projection 22 located below and abutting the transverse lug 23 on the roll-back. The lever 19 is freely or loosely pivotally connected at its upper end to the upper end of the transverse flange 8 by the rivet 24 which is fixed to the transverse flange and extends through the longitudinally extending slot 25 in the lever. Also the lever 19 is pivotally connected at its lower end to the lower portion of the dog 18 by the rivet 26, the lever overlying the dog and being positioned to clear the head of the rivet 21. The lever 19 is provided with the transverse abutment 27 intermediate its pivots and located adjacent the supporting pivot 21 of the dog 18.

The handle 20 is of the pull-out type and is formed of suitable material, such as metal or reinforced plastic, the handle, as shown, being formed of cast zinc. The handle has the grip portion 28 located generally in front of and closely adjacent to the outside panel 1, which is preferably formed with the pocket 29 to facilitate grasping the grip portion. It is apparent that if it is desired to produce a stream-line effect the outside panel may be formed with a pocket to completely receive the handle. The handle has the rounded nose 3ʳ for rolling engagement with the abutment 27 of the lever 19 upon swinging of the handle transversely of the outside panel. The handle is mounted directly on the escutcheon 31 which has the hollow body 32 extending through the outside panel and the integral transverse peripheral flange 33 at the outside edge of the body and overlying and abutting the outside panel at its outer side. The body has its end wall 34 nearest the pillar 3 formed with the tapped hole 35 and has its opposite end wall 36 forming a stop for abutting the handle when in its normal retracted position. The body also has the lugs 37 extending from the inside edges of its side walls 38 adjacent the end wall 36 for pivotally mounting the handle on the escutcheon. As shown, the handle has the lugs 39 located between the lugs 37 and journaled on the pin 40 which extends through both pairs of lugs. 41 is a reinforcement plate fixedly secured to the outside panel 1 at its inner side as by being welded thereto, this plate being formed with an opening for receiving the escutcheon body. The plate is also provided with the angling ear 42 which is preferably return-bent and extends at an angle corresponding to the adjacent portion 4 of the pillar 3. The reinforcement plate is further provided at opposite sides of the escutcheon body with the wedges 43 which are adapted to be engaged by the shoulders 44 upon the escutcheon body. 45 is a screw extending through the pillar portion 4 and the ear 42 and into the tapped hole 35 in the adjacent end wall of the escutcheon body, the axis of the tapped hole being inclined to the length of the body and at right angles to the pillar portion and ear. The construction is such that when the screw is tightened up it moves the escutcheon longitudinally relative to the outside panel toward the pillar and also moves the portion of the escutcheon adjacent the pillar transversely of the front panel and in an inward direction. Furthermore, the longitudinal movement of the escutcheon causes the shoulders 44 to ride up on the wedges 43. As a result, the peripheral flange 26 of the escutcheon is tightly clamped against the outside of the outside panel. To return the handle to its normal retracted position, I have provided the spring 46 which has intermediate portions 47 coiled around the pin 40, a looped end portion 48 engaging the handle, and transverse end portions 49 abutting the end wall 36 of the escutcheon body.

In operation, upon pulling the grip portion 29 of the handle 20 outwardly from the normal position of the handle, its nose 30 through the abutment 27 swings the lower end of the lever 19 toward the latch, thereby swinging the actuating dog 18 in a counterclockwise direction, as seen in Figure 4. The projection 22 of the actuating dog swings the roll-back 14 in a clockwise direction, as seen in Figure 3, through the abutment 27 and this roll-back slides the latch bolt 10 to retracted position. Upon release of the handle it will be returned to its normal position by the spring 46 and the roll-back will be returned to its normal position by the spring 50 which is secured to the base of the latch plate. This spring also serves to return the actuating dog and the lever to their normal positions. Also the spring 16 serves to return the latch bolt to its extended or latching position.

From the above description, it will be seen that I have provided an improved actuating mechanism for a latch in which the handle is of the pull-out type and free from positive connection with the latch whereby the handle may be returned by its retracting spring to normal position independently of the latch. As a result, sticking of the latch has no effect upon the handle to hold the latter out of normal retracted position. Also, by reason of actuating dog, lever and handle construction a powerful force can be exerted on the latch bolt and the latter can be fully retracted with a relatively small pull-out movement of the handle. Furthermore, the construction of escutcheon and reinforcement plate and the mechanism for securing the escutcheon in place provides a simple effective mounting for the handle.

What I claim as my invention is:

1. In a latch for a door having spaced outside and inside panels and a pillar therebetween, a latch plate having a base and a transverse flange secured respectively to the inside panel and pillar, a bolt carried by said plate and actuating mechanism for said bolt comprising a dog and a lever pivotally mounted on said flange and pivotally connected to each other, said dog being operatively connected to said bolt, and a pull-out handle movable transversely of the outside panel and operatively connected to said lever to actuate said bolt upon movement of said handle from normal position, said handle being movable to normal position independently of said bolt.

2. In a latch for a door having spaced outside and inside panels and a pillar therebetween, a latch plate upon the inside panel having a base and a transverse flange, a bolt carried by said plate and actuating mechanism for said bolt comprising a pivotal dog extending transversely of the inside panel and operatively connected to said bolt, a pivotal lever pivotally connected to said dog, a pivotal handle swingable transversely of the outside panel and having a portion in rolling abutment with said lever intermediate its pivots, and spring means for swinging said handle to normal position independently of said lever.

3. In a latch for a door having spaced outside and inside panels and a pillar therebetween, a latch plate on the inside panel having a base and a transverse flange, a bolt slidable on said plate, a roll-back pivotally mounted on said plate for sliding said bolt to released position and actuating mechanism for said bolt comprising a dog pivotally mounted on said flange and having a portion for abutting said roll-back, a lever pivotally mounted on said flange and overlying and pivotally connected to said dog, and a handle pivotally mounted on the outside panel and swingable transversely thereof, said handle having a rounded nose for rolling engagement with said lever intermediate its pivots and adjacent said dog.

JOSEPH GEORGE JOACHIM.